J. W. ROGERS,

Assignor to himself, F. & S. W. WINSLOW.

Machine for Buffing Shoe-Soles.

No. 8,895. Reissued Sept. 16, 1879.

Witnesses:
Henry Chadbourn.
E. Torrey

Inventor:
Josiah W. Rogers.
by Alban Andrews
atty.

UNITED STATES PATENT OFFICE.

JOSIAH W. ROGERS, OF SALEM, MASSACHUSETTS, ASSIGNOR TO HIMSELF, FREEMAN WINSLOW, AND SIDNEY W. WINSLOW, OF SAME PLACE.

IMPROVEMENT IN MACHINES FOR BUFFING SHOE-SOLES.

Specification forming part of Letters Patent No. 211,308, dated January 14, 1879; Reissue No. 8,895, dated September 16, 1879; application filed July 19, 1879.

*To all whom it may concern:*

Be it known that I, JOSIAH W. ROGERS, of Salem, in the county of Essex and State of Massachusetts, have invented certain new and useful Improvement in Machines for Buffing Shoe-Soles; and I do hereby declare the same to be described in the following specification and represented in the accompanying drawings, of which—

Figure 1:
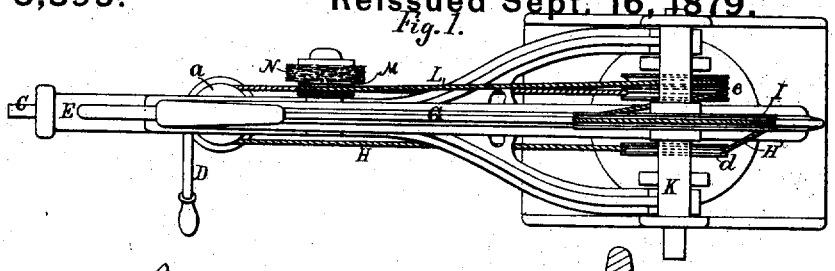
Figure 4:
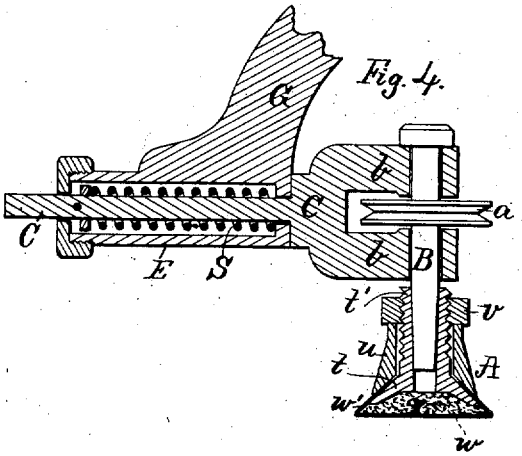
Figure 3:
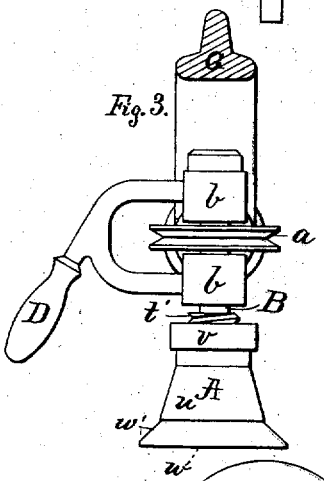
Figure 2:
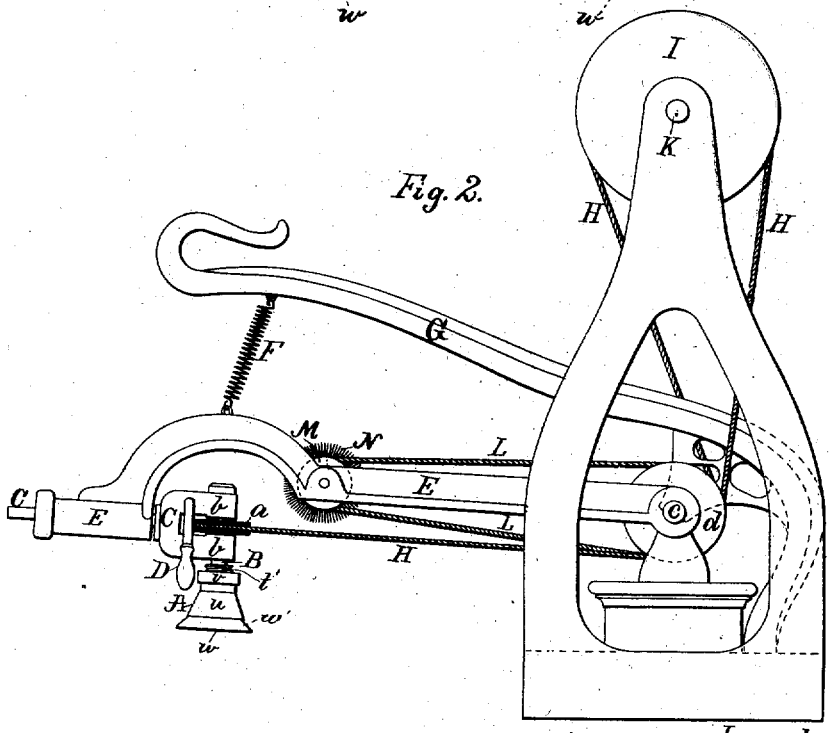

Figure 1 is a top view, and Fig. 2 a side elevation, of my improved buffing-machine. Fig. 3 is an inner side view of the rotary buffer-spindle carrier. Fig. 4 is a longitudinal section of such carrier, the buffer-spindle, and the arm for supporting such carrier.

The invention is carried out as follows: A represents the buffer-holder, fixed to or driven tightly upon a spindle, B, provided with a grooved wheel, *a*, and having its bearings supported in the prongs *b b* of a furcated arbor, C, provided with a handle. D. extended from it, as represented.

The aforesaid improved buffer-holder A is composed of the following parts, and constructed as follows: *t* and *u* are two concentric conic frusta, the former being provided with a cylindrical shank, *t'*, that is affixed to the spindle B, as shown in Fig. 4. The conic frustum *u* surrounds the frustum *t* as well as the shank *t'*, as shown. The shank *t'* is screw-threaded on its outer periphery, and provided with a nut, *v*. The latter is designed to engage with the screw-thread on the shank *t'*, and to bear against the upper end of the frustum *u*. The buffer-covering *w w'* extends between the two frusta *t* and *u*, and drawn upward and confined between them by screwing down the nut *b* against the outer frustum, *u*, as shown in Fig. 4.

I prefer to make the cylindrical and screw-threaded shank *t'* hollow, as shown, so as to be fitted onto the spindle B, as shown in Fig. 4.

The arbor C is pivoted within and supported by a long arm, E, which, forked as shown, is pivoted upon a shaft, *c*, extending between and through its prongs, and supported in suitable uprights Furthermore, the arm E is sustained by a spring, F, extending down from a stationary arm, G, arranged as represented.

There are upon the shaft *c* two grooved pulleys, *d e*. They revolve freely upon it, and serve as guides to an endless band, H, which goes partly around the pulley *a*, and a pulley, I, arranged as shown, over the shaft *c* and fixed on a driving-shaft, K. Furthermore, the pulley *e* has two grooves in and around its circumference, in the outer one of which another endless band, L, runs, such band being carried about a pulley, M, fixed to the side of a rotary brush, N, pivoted to the arm E, and arranged as shown.

On revolving the shaft K the buffer and the brush will be simultaneously put in rapid revolution.

By holding a shoe firmly with one hand and bearing its sole up to the buffer while the latter may be in revolution, the operator with his other hand holds the handle D, and can turn the buffer-spindle carrier around its axis, as may be required, so as to impart a curvilinear swinging motion to the buffer, in order that it may properly act on the sole, whether in the shank or other part thereof, by which arrangement both the shoe and the buffer are reciprocated very similar to the usual buffing by hand.

The spring F enables the operator to force the buffer upward in order to vary its inclination somewhat in the direction of the carrying-arm, as may be required.

The endless band, by being applied to the buffer-spindle and arranged with the guide-pulleys in a manner as described, admits of the arbor C being turned in its bearings, as may be required, for the purpose set forth.

By having one of the guide-pulleys with two grooves, as described, it answers not only as a guide for the main driving-band, but as a means of giving motion to the brush-operating band.

Within the carrying-arm E, and encompassing the pivoted arbor C, is a helical spring, S, which is applied so as to draw back the said arbor to keep taut the driving-band H of the buffer-spindle, especially while the carrying-arm is being moved upward or downward.

The brush N is for the purpose of cleansing the sole of the dust left on it after the buffing of it may have been either wholly or partly accomplished.

What I wish to secure by Letters Patent, and claim, is—

1. The combination of the stationary arm G, the spring F, carrying arm E, furcated arbor C, and the buffer-spindle B, provided with mechanism for revolving it, as set forth.

2. The combination of the spring S, the furcated arbor C, the carrying-arm E, the buffer-spindle B, and the mechanism as described for revolving it.

3. In a buffing-machine, the rotary buffer A, supported in bearings *b b*, the latter being provided with a spindle, C, so as to impart a swinging movement to the buffer in a lateral direction to its axis of rotation, as described.

4. The herein-described pad-holder for sole-buffing machines, consisting of the two conic frusta *t* and *u*, the hollow screw-threaded shank *t'*, and nut *v*, substantially as set forth.

5. In a buffing-machine for boot and shoe soles, the rotary buffer A, its spindle B, arranged in the bearings *b b*, having the shaft C and handle D, for the purpose of imparting a lateral swinging movement to the buffer, as herein described.

JOSIAH W. ROGERS.

Witnesses:
ALBAN ANDRÉN,
NELLIE F. SAUL.